United States Patent [19]
Teng et al.

[11] Patent Number: 6,165,546
[45] Date of Patent: *Dec. 26, 2000

[54] SPECTRALLY TUNED MULTIPLE BANDPASS FILTERS FOR VIDEO DISPLAYS

[75] Inventors: Chia-Chi Teng, Piscataway; Suk Youn Suh, Warren; Hyun-Nam Yoon, Providence, all of N.J.

[73] Assignee: Asahi Glass Company, Limited, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/111,144

[22] Filed: Jul. 7, 1998

Related U.S. Application Data

[62] Division of application No. 08/753,349, Nov. 25, 1996, Pat. No. 5,834,122.

[51] Int. Cl.[7] .............................. B05D 5/06; C03C 17/00; G02B 1/10
[52] U.S. Cl. .......................................... 427/163.1; 427/164
[58] Field of Search ..................................... 427/164, 163, 427/157, 163.1, 163.2, 163.3, 163.4

[56] References Cited

U.S. PATENT DOCUMENTS

| | | | |
|---|---|---|---|
| 4,191,725 | 3/1980 | Armstrong et al. | 264/261 |
| 4,808,501 | 2/1989 | Chiulli | 430/7 |
| 4,987,338 | 1/1991 | Itou et al. | 313/478 |
| 4,989,953 | 2/1991 | Kirschner | 350/311 |
| 5,200,667 | 4/1993 | Iwasaki et al. | 313/478 |
| 5,291,097 | 3/1994 | Kawamura et al. | 427/126.3 |
| 5,523,114 | 6/1996 | Tong et al. | 427/68 |

FOREIGN PATENT DOCUMENTS

| | | | |
|---|---|---|---|
| 2-210486 | 8/1990 | Japan | G09F 9/00 |

*Primary Examiner*—Fred J. Parker
*Assistant Examiner*—Paul D. Strain
*Attorney, Agent, or Firm*—Oblon, Spivak, McClelland, Maier & Neustadt, P.C.

[57] ABSTRACT

Disclosed in this invention is an optical filter to enhance the contrast and brightness of images from a color display. The filter comprises suitable dyes and a polymer matrix, applied in a suitable form on the display unit. Such filters have utility in devices based on CRTs, plasmas and the like.

6 Claims, 3 Drawing Sheets

SPECTRALLY TUNED MULTIPLE BANDPASS FILTERS FOR VIDEO DISPLAYS

This application is a divisional application of U.S. application Ser. No. 08/753,349, filed Nov. 25, 1996, now U.S. Pat. No. 5,834,122.

FIELD OF THE INVENTION

This invention generally discloses optically shaped articles for video display devices and similar articles. It specifically discloses spectrally tuned multiple bandpass filters that enhance the contrast of images on the screen.

BACKGROUND OF THE INVENTION

Video display devices are nowadays widely used in articles such as televisions, computers, video games and the like. Many of them generally employ a cathode ray tube ("CRT") which is a vacuum tube display device in which the image is created by electrons from an electron gun striking a phosphor screen that converts the electron energy into light energy over a wide wavelength range, usually the visible range for common display devices such as television and computer monitors. The CRT may be monochromatic (single color) or a color display device which produces images in more than one color, typically the three primary colors: red, green and blue.

A common problem with video display devices is the light reflected from the device towards the viewer, which generally fatigues the viewer's eyes. The reflected light consists of ambient light reflecting off the surface of the screen (which is typically a glass surface) as well as ambient light reflecting off the phosphors behind the screen. Several attempts have been made in the past to avoid or reduce this reflected light. U.S. Pat. No. 4,989,953, in col. 2, line 13 through col. 3, line 22, describes some of these earlier attempts and the problems associated with them. Most of these attempts, however, have succeeded in reducing the glare from monochromatic display monitors only.

For color displays, earlier attempts to reduce light reflection included, for example, use of a neutral density filter. Neutral density filters or attenuators are designed to produce attenuation that is uniform regardless of the wavelength. See, for example, Jeff Hecht, "The Laser Guidebook," 2nd edition, McGraw-Hill, Inc., New York, 1992, p.79. Such filters comprise colloidal suspensions of silver or graphite particles in a suitable medium and adhered to the monitor surface. This type of filter transmits a fraction of the light passing through it, independent of the wavelengths. In fact, neutral density filters are widely used in the manufacturing of current color CRT displays for lack of no better alternative. These filters, however, have the disadvantage of reducing the brightness of the image.

Another approach has been to use selective filtration by using different colored plates to absorb certain wavelengths. They, however, suffer the disadvantage that one has to use a different color filter for each phosphor element. Combining several filter materials in order to transmit just the desired red, green and blue generally results in the absorption of some of the desired wavelengths due to cascading of the different filter materials. This reduces the amount of red, green and blue that eventually gets transmitted.

Yet another approach involves a combination of neutral density filter and an antireflection coating. While this cuts down the reflected light, it also reduces the brightness and the resolution of the image.

U.S. Pat. No. 5,121,030 discloses absorption filters which contain a transparent substrate with a plurality of spatially separated areas that contain selective absorptive dye colorants. Since this requires spaced areas with different dye component therein, the construction of the filter is quite complex and difficult to manufacture in large quantities.

U.S. Pat. No. 4,989,953 referred to above advocates the use of colored filters for monochromatic displays. Thus, for example, a magenta colored filter is used for CRTs with green phosphors, and a blue colored filter is used for amber colored CRTs. However, this concept is not much useful for color displays, because the blue filter, for example, will block out the red and/or green depending on the spectral characteristics of the filter. The same problem exists for the other color filters too that the '953 patent discloses. If such filters are used for full color displays, the resulting display color will be severely distorted. For this reason, the '953 patent suggests that a neutral density or gray colored filter must be used for multi-color or black and white displays. However, this approach, as stated before, reduces the brightness of the display. Since neutral density filters absorb a substantial amount of the desired light, the displays using neutral density filters must be capable of producing intense light. This was one of the reasons for developing super bright phosphors for display applications. They increase the cost, however.

Another kind of display devices utilizes a plasma-generated uv light, which hits the phosphors and generate visible light for the display. In such plasma displays currently being developed by various display manufacturers the phosphors still do not have high enough brightness. Therefore, neutral density filters cannot be used for plasma display applications since they will reduce the brightness still further. Instead, very expensive circular polarizer-based contrast enhancing filters are being used.

Thus, there is a need in the industry to have some device or mechanism to reduce the reflected light from color CRTs and other displays such as plasma displays and the like without significantly sacrificing the brightness and resolution of the image.

It is, therefore, an object of this invention to provide a filter for color displays to reduce light reflected off such displays.

It is an additional object of this invention to provide an article to enhance the contrast of images from a color display monitor without significantly sacrificing brightness of the image therefrom.

It is a further object of this invention to provide a spectrally tuned multiple bandpass filter for color displays, specifically matched to the three primary colors, namely red, green, and blue.

Other objects and advantages of this invention will be apparent to those skilled in the art from the accompanying description and examples.

BRIEF DESCRIPTION OF THE DRAWINGS

The present invention is described in view of the description below as well as with the enclosed FIG. 1, FIG. 2 and FIG. 3.

SUMMARY OF THE INVENTION

Figure 1:
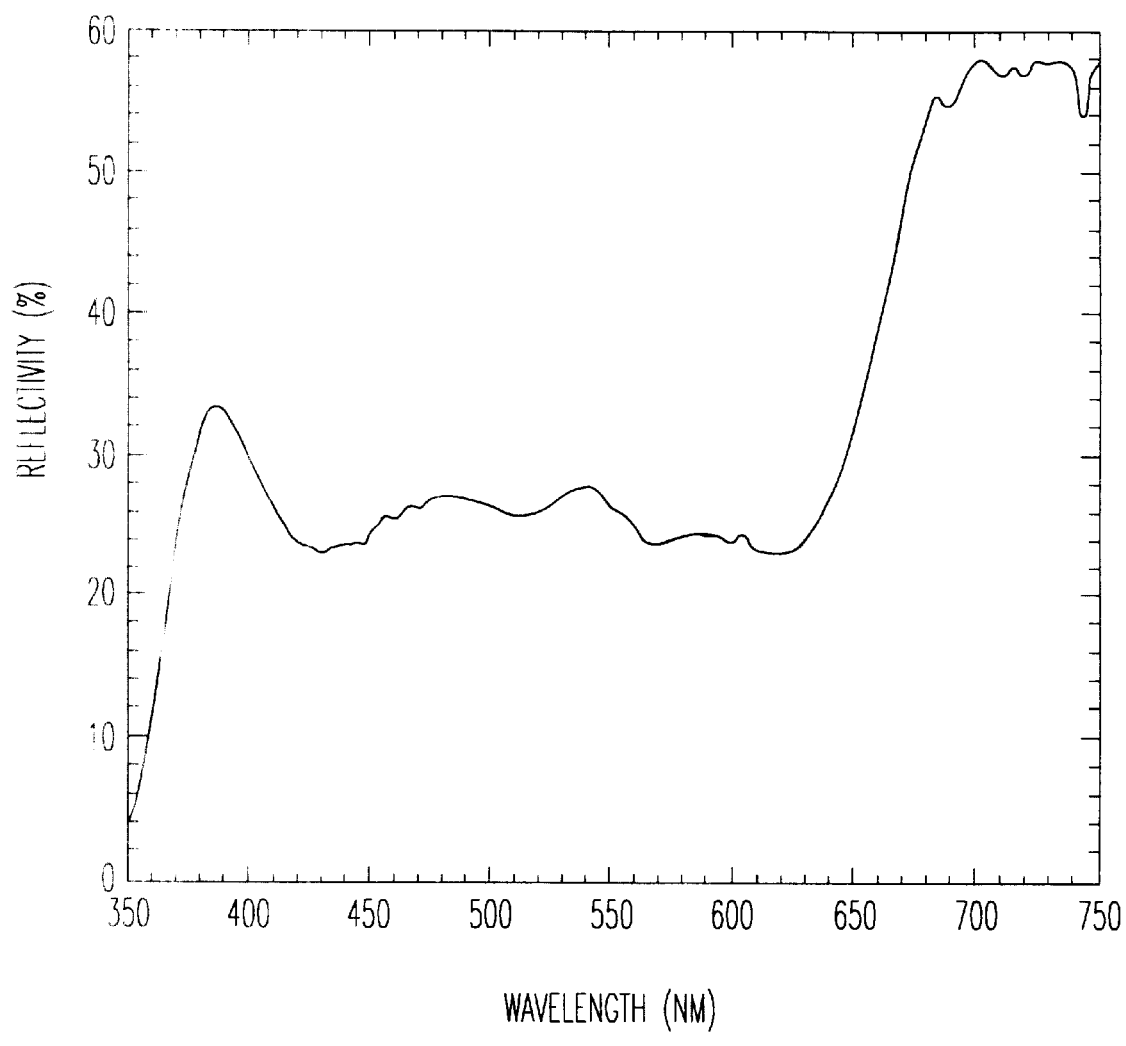
FIG. 1 displays the reflectivity of a CRT color phosphor screen.

One or more of the foregoing objects are achieved by the provision in the present invention of a spectrally tuned multiple bandpass filter which is adherable to a display monitor surface in a variety of ways and enhances the contrast of the image without significantly affecting the brightness and resolution of the image. The filter comprises one or more dyes which are adapted to substantially selectively transmit predetermined primary color wavelengths of an electromagnetic spectrum as well as to selectively absorb wavelengths other than said predetermined primary color wavelengths. The dyes may be on a suitable transparent substrate which is then adhered to the monitor surface, or alternately, the dyes may be directly deposited on the monitor surface by a suitable process such as, for example, spray coating. The word "spectrally tuned" refers to the substantial selective transmission (at least 50%) of the predetermined primary colors; the word "transparent" refers to at least 70% transmission of light of the electromagnetic spectrum which in the common case such as television display devices such as CRT, plasma displays and the like, is the visible light. In such a case, the primary colors are red, green and blue. The dyes may be organic or inorganic although organic dyes are preferred. Suitable transparent substrate may be organic or inorganic although organic polymeric substrate is preferred. In other words, the invention discloses spectrally tuned multiple bandpass filters, specifically matched to the three primary colors, i.e., red, green, and blue.

Additionally, the present inventive bandpass filter allows one to expand the color gamut by adjusting the spectral bandwidth of the band pass windows in the respective wavelengths, thereby allowing more vivid and realistic colors on CRT's. This is a significant improvement over present CRT technology.

Still additionally, if one so desired, one may deposit a suitable antireflection coating on top of the inventive contrast enhancing filter. In that case, the antireflection coating should be chosen as not to affect the integrity of the filter physically, chemically and optically. Suitable antireflection coatings are described, for example, in U.S. Pat. No. 5,178,955.

In one illustration, a set of suitable dyes such as, for example, Fluorescein amine isomer I, Phloxine B, Sulforhodiamine 101 and Luxol (all available from Aldrich Chemical Company, Milwaukee, Wis.), is dissolved in a suitable solvent, optionally mixed with a polymer matrix and cast into a film of suitable thickness by a suitable process. This film is then attached to the monitor surface by known processes. Alternately, the dye solution or the dye/polymer solution may be coated on a suitable polymer film which may then be attached to the monitor surface. Still alternately, the solution of dyes and the optional polymer matrix may be mixed with an optional volatilizer and then spray coated on to the surface of the monitor and the solvent is then volatilized off. The film on the monitor surface absorbs preferentially the unwanted wavelengths with minimal absorption of the primary colors. Thus, the transmitted light is sharper and richer in the primary colors. Improvements in the color transmission in the primary colors to 20% and above compared to neutral density filters are obtained, while decrease in the transmission of the unwanted wavelengths to the extent of 50% is obtained.

DESCRIPTION OF THE INVENTION

The present invention discloses a spectrally tuned multiple bandpass filter (notch filter) which substantially increases the transmission of the primary colors from the reflected light of a color display device while substantially absorbing the non-primary colors, and thereby improves the contrast of the image for the viewers. In one embodiment, the filter comprises a set of suitable dyes that substantially absorb the non-primary colors, without significant effect on the primary colors.

Contrast from a display device screen is generally defined by the term 'contrast ratio'. Contrast ratio, C, is commonly defined by the Equation 1:

$$C = \frac{\int T(\lambda)S(\lambda)I_p(\lambda)d\lambda}{\int T^2(\lambda)S(\lambda)I_a(\lambda)R(\lambda)d\lambda} \quad (1)$$

where T is the transmittance of the substrate as a function of wavelencth $\lambda$, S is human eye spectral sensitivity function, $I_p$ and $I_a$ are respectively the display source intensity (e.g., phosphor emission intensity) and the ambient light source intensity, and R is the Reflection Coefficient for the display phosphors. As can be seen, C can be increased by making $I_a$ and/or $T(\lambda)$ arbitrarily small for a given display system. However, if a display is viewed in the total darkness ($I_a$ very small), although one can have very high contrast, it becomes very difficult to compare two different displays without using an identical condition. Display industries are therefore making an attempt to use a standardized ambient light condition in comparing display performance. Similarly by increasing $I_p$, one can improve C. In fact, display industry is working very hard to increase $I_p$. Since $I_a$ and $I_p$ are independent of contrast enhancing devices, normalized intensities functions given in Equations 2 and 3 are generally defined in order to compare the performance of contrast enhancing devices:

$$i_p = \frac{\int T(\lambda)S(\lambda)I_p(\lambda)d\lambda}{\int S(\lambda)I_p(\lambda)d\lambda} \quad (2)$$

and $$i_a = \frac{\int T(\lambda)S(\lambda)I_a(\lambda)d\lambda}{\int S(\lambda)I_a(\lambda)d\lambda} \quad (3)$$

where $i_a$ and $i_p$ are normalized ambient and display intensities respectively. Normalized contrast ($\bar{c}$) and the figure-of merits ($\eta$) are defined as in Equations 4 and 5 respectively:

$$\bar{C} = \frac{i_p}{i_a} \quad (4)$$

and $$\eta = \bar{C}i_p = \frac{i_p^2}{i_a} \quad (5)$$

For an ideal neutral density or similar filters, there is no improvement in the figure-of merits, i.e., $\eta=1$. Thus, they do not improve the real performance, but provide a trade-off between display brightness and contrast. In other words, they offer contrast enhancement at the expense of image brightness. Thus, for example, for a 50% absorptive neutral density filter, contrast may be doubled, i.e. $\bar{c}=2$, $i_p=0.5$ and $i_a=0.25$. But there is 50% absorption.

On the other hand, the inventive spectrally selective filter described below performed significantly better for both the NTSC ("National Television Systems Committee") and the PAL ("Phase Alternating Line") system specifications. The reflectivity of a CRT color phosphor screen is shown in FIG.

Figure 2:
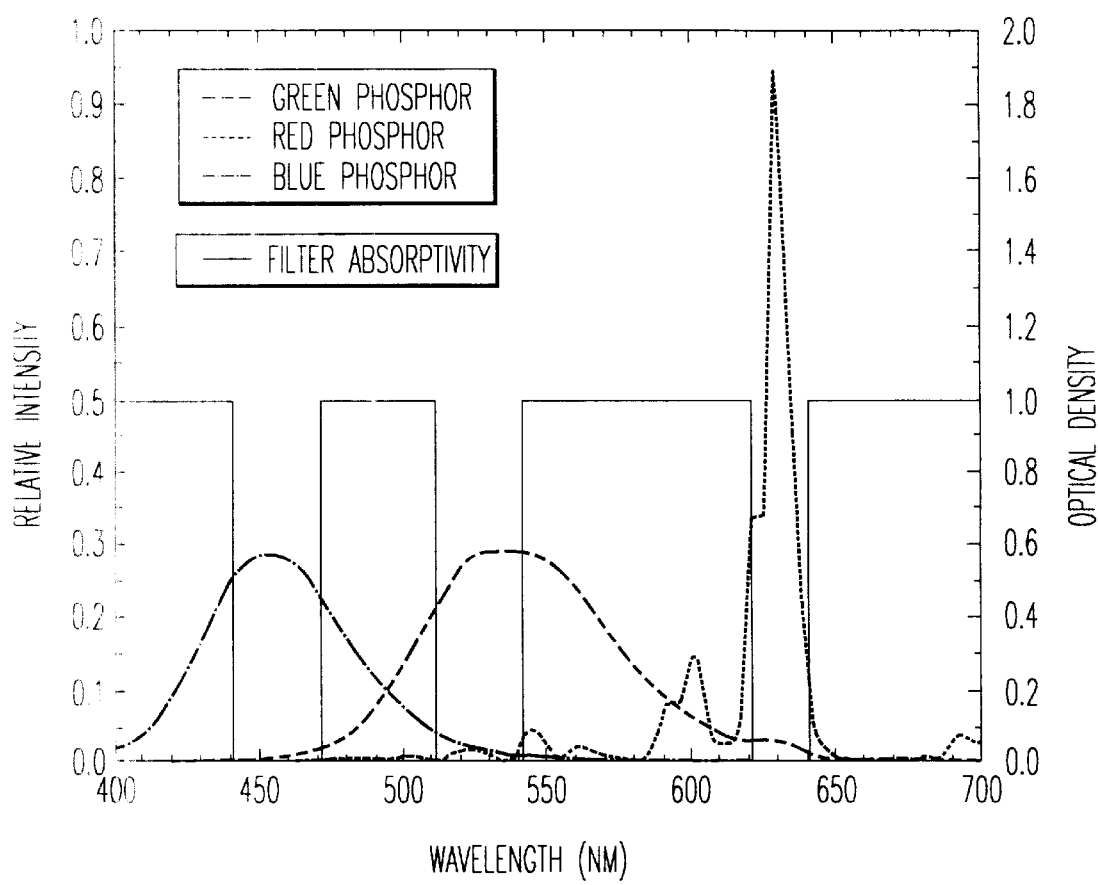
FIG. 2 displays the the phosphor emission spectrum of a PAL ("Phase Alternating Line") system.

1, and the PAL system specification of the phosphor emission spectrum is shown in FIG. 2. The spectral characteristics of the inventive filter for the PAL specification is also shown in FIG. 2, which shows that the calculated figure-of-merit η goes up at least 1.3 times, while the brightness loss was only about 40%. The inventive filter had the following values: $\bar{c}=2.0$, $i_p=0.6$ and $i_a=0.34$. This is a good improvement over the ideal neutral density filter performance. For the NTSC system, due to narrower green phosphor emission spectrum, the improvement in the figure-of-merit η is at least two-fold. In this case, the numbers for the inventive filter were: $\bar{c}=2.4$, $i_p=0.8$ and $i_a=0.34$. This represents about 100% improvement in the brightness over the neutral density filters for the same contrast enhancement. The details below illustrate the inventive filters and the process of making them.

In one embodiment, the invention discloses spectrally tuned filters for display applications. The filters comprise suitable dyes and a polymer matrix and it may be present on the CRT monitor with or without an intermediary polymeric substrate. Suitable dyes are those which selectively and absorb undesired wavelengths without significantly absorbing the desired wavelengths. The desired wavelengths correspond to the three primary colors; red, blue and green. Table 1 lists illustrations of some suitable dyes useful in the practice of the invention. Many of these are commercially available trademarked materials from various sources.

Table 1. List of Some Suitable Dyes

Astrazon Orange G
Brilliant Blue R
Luxol Fast Blue MBSN
Bromochlorophenol Blue Sodium salt
Bromophenol Blue Sodium salt
Bromocresol Purple Sodium salt
2',7'-Dichlorofluorescein
Eosin Y
Fluorescein
Fluorescein amine isomer 1
Fluorescein amine isomer 11
Fluorexon
Bromophenol Blue
Acridine Orange
Acridine Orange base
o-Cresolphthalein
o-Cresolphthalein complexone
Cresol Red
Fast Blue
Mordant Orange 1
Phloxine B
Pyronin B
Rhodamine 123 Hydrate
Sulfobromophthalein Sodium Hydrate
Sulforhodamine 101 Hydrate
Chlorophenol Red Another embodiment of the present invention discloses a process for preparing the spectrally tuned filters. A set of suitable dyes (e.g., from Table 1) is dissolved in a suitable solvent to sufficient enough concentration to result in sufficient absorption of the undesired wavelengths in the transmitted light when on the monitor. Sufficient absorption is generally over 20%, preferably over 50% and typically over 80%. Suitable solvents are those that are compatible with the solvents chosen for the polymer matrix material as well as dependent on whether or not the dye/polymer matrix combination is going to be present on a polymeric substrate before going on the monitor. Such modifications and techniques will be obvious to those skilled in the art of coatings. Generally lower alcohol, water and the like solvents are non-corrosive and compatible with each other. Thus, for example, the dyes may be dissolved in a lower alcohol to form solution A, the polymer matrix material may be dissolved in water or alcohol to form solution B and the two solutions may then be mixed in sufficient quantities. Polymer matrix materials are those polymers which are compatible with the other materials mentioned above and also form optically transparent films. Some examples include polyvinyl alcohol ("PVOH"), polyvinyl acetate ("PVA"), vinyl polymers and polyacrylates such as polyolefins, polymethyl methacrylate ("PMMA"), polystyrene, polycarbonate, cycloolefin polymers and copolymers ("COC"), polyurethane, polyamide, polyester, polyether, polyketone, polyesteramide and the like. Many of them may also be crosslinkable by suitable techniques such as, for example, thermal, radiation cure and the like. After mixing solutions A and B, one may optionally add additives such as, for example, viscosity modifiers, surfactants, volatilizers and the like in order to ease and/or enhance film casting, film drying, film thickness and the like. Such techniques are well known in the coatings industry.

Film may be cast by any suitable technique such as, for example, solvent casting, extrusion, spray coating, roller coating, dip coating, brush coating, spin coating and the like. Such film forming techniques are well known. Alternately, instead of mixing the two solutions the polymer matrix film may be cast first as film and then dyed. The film may then be affixed to the monitor surface by a suitable method such as, for example, use of adhesives.

Still alternately, the solution may be spun coated on a suitable substrate as a film. The coated substrate may then be affixed to the monitor surface by a suitable method such as, for example, use of adhesives. Suitable substrates are glass as well as polymeric. Suitable polymeric substrates are optically transparent polymers such as, for example, polyesters, polyacrylates, polyolefins, polycarbonate and the like. Among polyesters, polymer films such as polyethylene terephthalate ("PET"), polybutylene terephthalate ("PBT") are preferred.

In yet another alternate manner, the dye/polymer mix may be directly sprayed on the monitor to form a suitable film. The invention is flexible enough to accommodate such varied methods.

In an illustration, a set of dyes, Fluorescein amine isomer I, Phloxine B, Sulforhodiamine 101 and Luxol, was dissolved in methanol to near saturation. Separately, PVOH was dissolved in water to about 20 weight percent. The dye solution was added to the PVOH solution in order to make the following final concentration of dyes (g/g) in the solution: $1.06\times10^{-4}$ of Fluorescein amine isomer I, $1.00\times10^{-4}$ of Phtoxine B, $5.10\times10^{-4}$ of Sulforhodiamine 101 and $1.35\times10^{-4}$ of Luxol. A few drops (~0.01% by weight) of the surfactants Genepole® and Dynol® were added. The film was spun-coated on a 4 mil (100 μm) thick PET film at about 1000 rpm for about 30 seconds. The film was then dried in an oven at about 50° C. for about 30 minutes to achieve a total dry film thickness of about 8 μm. This was mounted on a monitor (a 5"diameter color television monitor). If desired, one may use clear adhesives for such mounting. As described earlier, the inventive filters significantly enhanced contrast for both the NTSC and the PAL systems without significantly decreasing the brightness of the images.

Figure 3:
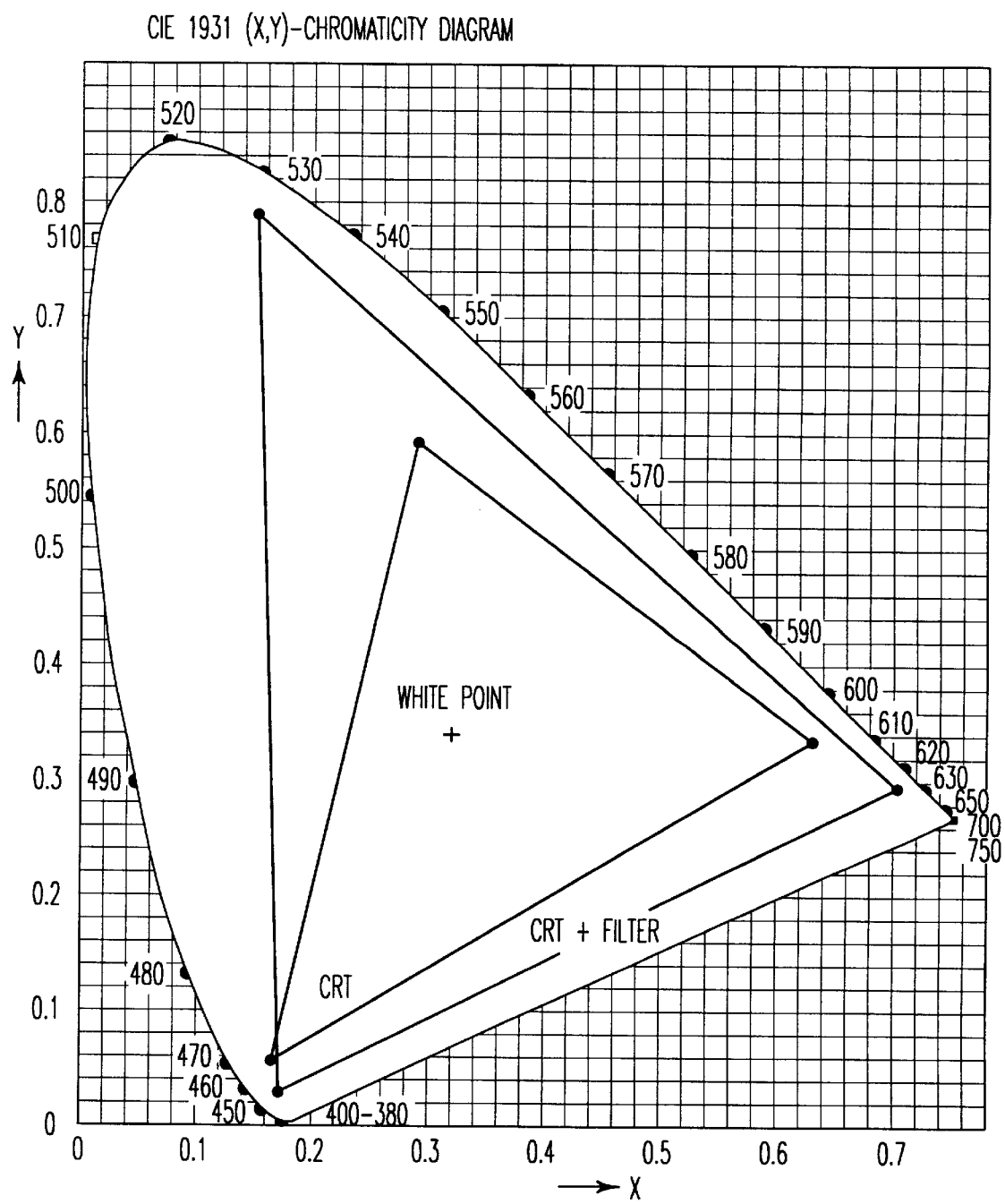
FIG. 3 shows the color space for the PAL system both with and without the inventive filter as an (x,y)-Chromaticity diagram.

The inventive contrast enhancing filter offers an additional advantage over the conventional devices for the contrast enhancement. The color gamut, which is a rough calculation for total color space, is significantly improved with the inventive filters. The images thus are sharper and brighter. FIG. 3 shows the color space for the PAL system both with and without the inventive filter. The color space is enlarged as much as 50% more than in the typical PAL CRT. The color coordinates of the CRT without the inventive filters are (0.62, 0.33), (0.28, 0.58) and (0.16, 0.60). With the inventive filters, the same coordinates are expanded to (0.68, 0.30), (0.15, 0.76) and (0.17, 0.30) respectively, thus demonstrating that the inventive filters not only enhance the contrast of the images but also offer much brighter and sharper primary colors. Such advantages enhance the utility of the CRT as well as the other display devices such as plasma displays and the like, when the inventive filters are part of the device.

What is claimed is:

1. A process of preparing a multiple band pass filter for contrast enhancement of a color display, said filter comprising a uniform layer having a plurality of dyes intermixed in a polymer matrix, wherein said dyes substantially selectively transmit predetermined primary color wavelengths of an electromagnetic visible spectrum as well as selectively absorb wavelengths other than said predetermined primary color wavelengths comprising:

(a) dissolving a polymer matrix resin of said polymer matrix in a suitable solvent to form a first solution;

(b) dissolving said plurality of dyes in a suitable solvent to form a second solution, wherein said solvent in step (a) and said solvent in step (b) are the same or different, and if different, miscible;

(c) combining said first solution and said second solution; and (d) forming a film from said combined solution of step (c) by a suitable process to prepare the multiple band pass filter.

2. The process of claim 1, wherein said combined solution of step (c) is further mixed with a viscosity modifier or a volatilizer.

3. The process of claim 1, wherein said film in step (d) is formed by a process selected from the list consisting of spin coating, spray coating, roller coating and brush coating.

4. The process of claim 3, wherein said process is spin coating.

5. The process of claim 1, wherein said film of step (d) is formed directly on said color display.

6. The process of claim 1, wherein said film of step (d) is formed on a polymer substrate followed by affixing said film-coated substrate on said color display.

* * * * *